(12) United States Patent
Li et al.

(10) Patent No.: US 10,640,850 B2
(45) Date of Patent: May 5, 2020

(54) NANOPARTICLE-STABILIZED IMMISCIBLE ALLOYS

(71) Applicant: Wisconsin Alumni Research Foundation, Madison, WI (US)

(72) Inventors: Xiaochun Li, Manhattan Beach, CA (US); Lianyi Chen, Madison, WI (US); Jiaquan Xu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 50 days.

(21) Appl. No.: 16/020,175

(22) Filed: Jun. 27, 2018

(65) Prior Publication Data

US 2018/0320252 A1  Nov. 8, 2018

Related U.S. Application Data

(62) Division of application No. 13/669,636, filed on Nov. 6, 2012, now Pat. No. 10,036,084.

(51) Int. Cl.
| | |
|---|---|
| *C22C 1/06* | (2006.01) |
| *C22C 21/00* | (2006.01) |
| *C22C 1/02* | (2006.01) |
| *B32B 15/01* | (2006.01) |
| *B22F 1/02* | (2006.01) |
| *C22C 1/10* | (2006.01) |
| *C22C 32/00* | (2006.01) |

(52) U.S. Cl.
CPC .............. *C22C 21/003* (2013.01); *B22F 1/02* (2013.01); *B32B 15/016* (2013.01); *C22C 1/02* (2013.01); *C22C 1/026* (2013.01); *C22C 1/06* (2013.01); *C22C 1/1036* (2013.01); *C22C 21/00* (2013.01); *C22C 32/0047* (2013.01); *C22C 2001/1047* (2013.01)

(58) Field of Classification Search
CPC . B22F 1/02; B32B 15/016; C22C 1/02; C22C 1/026; C22C 1/06; C22C 1/1036; C22C 2001/1047; C22C 21/00; C22C 21/003; C22C 32/0047
USPC ........................................................ 75/249
See application file for complete search history.

(56) References Cited

U.S. PATENT DOCUMENTS

| | | | | |
|---|---|---|---|---|
| 5,066,324 A | * | 11/1991 | Perepezko | ............. B22D 27/20 264/0.5 |
| 8,500,925 B2 | * | 8/2013 | Kaptay | ..................... C22C 1/00 148/400 |
| 9,162,931 B1 | * | 10/2015 | Hoffman | ................... B32B 5/16 |

* cited by examiner

*Primary Examiner* — Jie Yang
(74) *Attorney, Agent, or Firm* — Bell & Manning, LLC; Michelle Manning

(57) ABSTRACT

Solid immiscible alloys and methods for making the solid immiscible alloys are provided. The microstructure of the immiscible alloys is characterized by a minority phase comprising a plurality of particles of an inorganic material dispersed in a majority phase comprising a continuous matrix of another inorganic material. The methods utilize nanoparticles to control both the collisional growth and the diffusional growth of the minority phase particles in the matrix during the formation of the alloy microstructure.

6 Claims, 10 Drawing Sheets

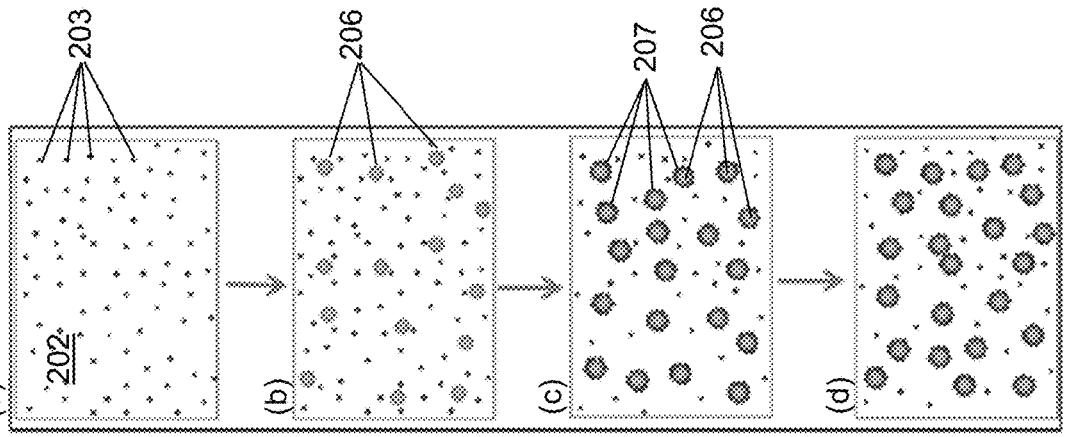
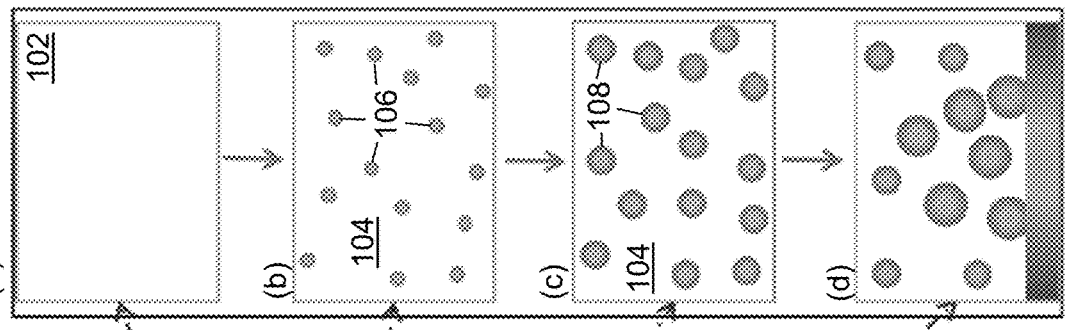
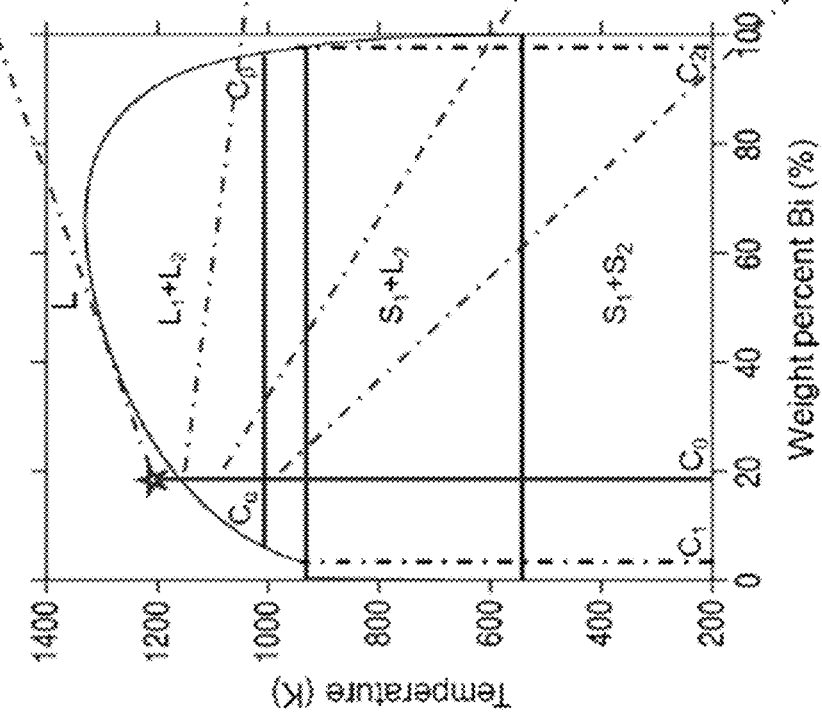

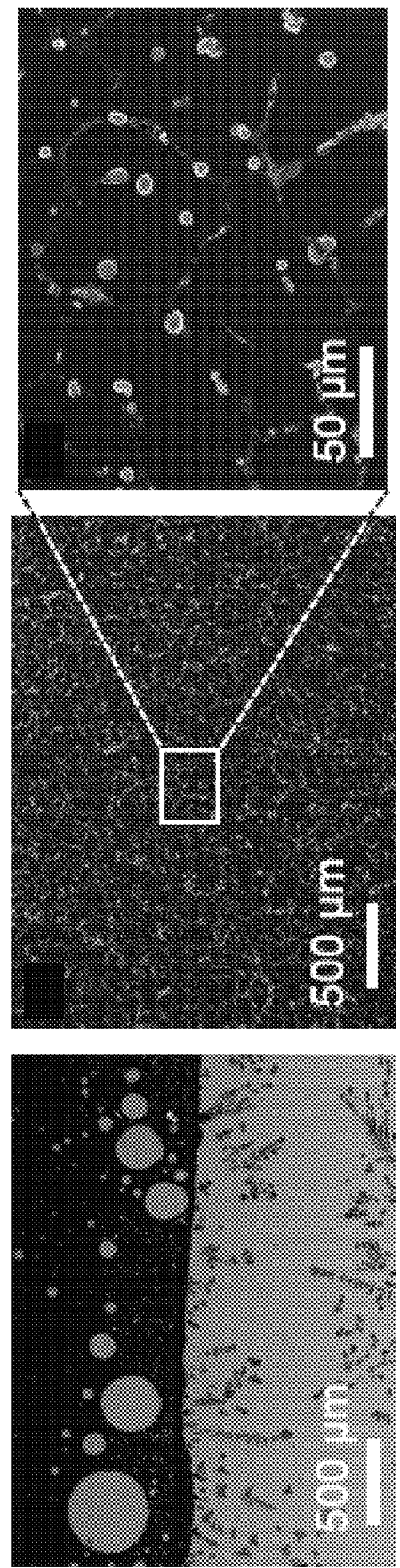

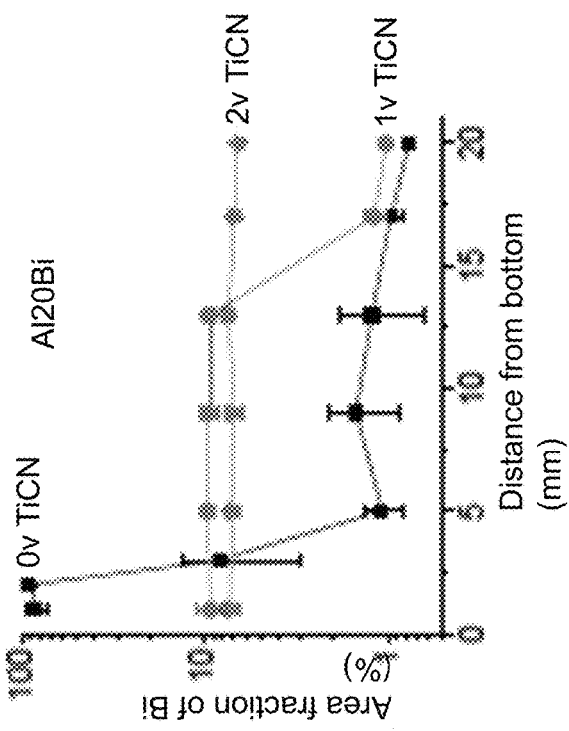
FIG. 2E
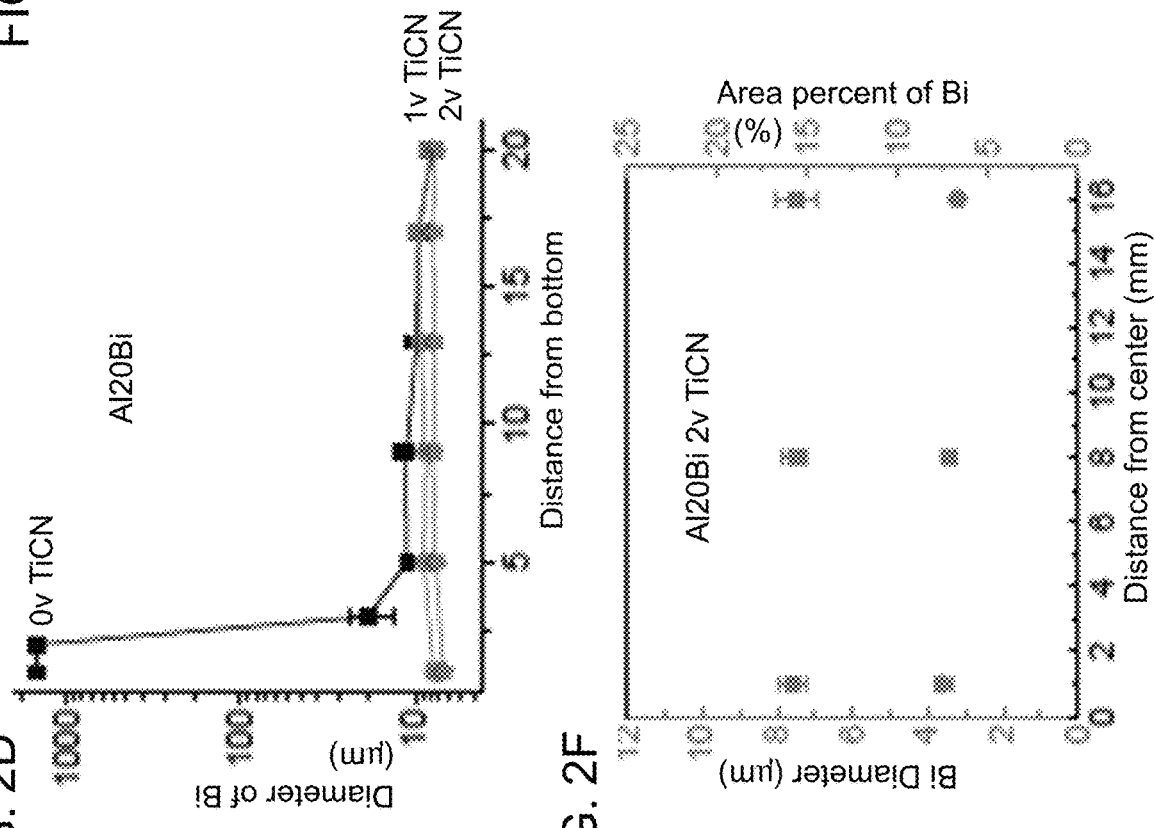
FIG. 2D
FIG. 2F

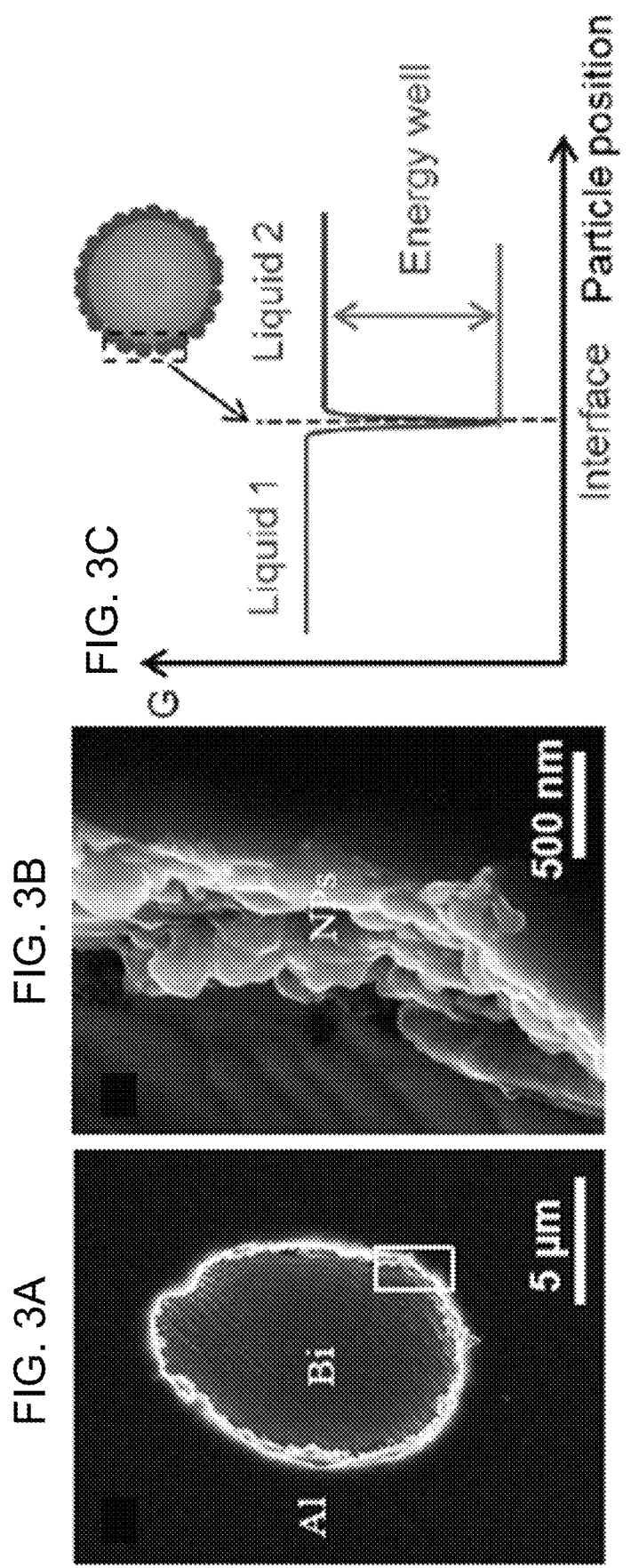

| Cooling rate (K/s) | $d_{Bi}$ (um) | t (s) | D ($m^2s^{-1}$) | s |
|---|---|---|---|---|
| 1 | 10.01 | 243 | $1.1 \times 10^{-8}$ | 0.032 |
| 27 | 4.04 | 9.00 | $1.1 \times 10^{-8}$ | 0.032 |
| 60 | 3.70 | 4.05 | $1.1 \times 10^{-8}$ | 0.032 |
| 313 | 3.42 | 0.77 | $1.1 \times 10^{-8}$ | 0.032 |
| 3840 | 3.46 | 0.06 | $1.1 \times 10^{-8}$ | 0.032 |

FIG. 7

| Sample | $C_{np}$ | $C_0$ | $C_1$ | $C_2$ | $T_d$ (K) | $T_m$ (K) | $D$ (m²s⁻¹) | x | s | v (Ks⁻¹) | $k_{np}$ (s⁻¹) | $T_{np}$ (s) |
|---|---|---|---|---|---|---|---|---|---|---|---|---|
| 20Bi 1 v% | 0.01 | 0.064 | 0.0096 | 0.918 | 1173 | 930 | 1.1×10⁸ | 0.184 | 0.032 | 1 | 11340 | 0.0088 |
| 20Bi 2 v% | 0.02 | 0.064 | 0.0096 | 0.918 | 1173 | 930 | 1.1×10⁸ | 0.368 | 0.032 | 1 | 11340 | 0.0044 |
| 14Bi 2 v% | 0.02 | 0.043 | 0.0096 | 0.918 | 1118 | 930 | 1.1×10⁸ | 0.599 | 0.019 | 1 | 11340 | 0.0044 |
| 10Bi 2 v% | 0.02 | 0.03 | 0.0096 | 0.918 | 1073 | 930 | 1.1×10⁸ | 0.980 | 0.011 | 1 | 11340 | 0.0044 |

FIG. 8

NANOPARTICLE-STABILIZED IMMISCIBLE ALLOYS

CROSS-REFERENCE TO RELATED APPLICATIONS

The present application is a divisional of U.S. patent application Ser. No. 13/669,636 that was filed Nov. 6, 2012, the entire contents of which are hereby incorporated herein by reference.

REFERENCE TO GOVERNMENT RIGHTS

This invention was made with government support under 70NANB10H003 awarded by the National Institute of Standards and Technology. The government has certain rights in the invention.

BACKGROUND

Immiscible alloys with a miscibility gap in the liquid state are scientifically important and can offer unusual properties that may be useful for a wide range of applications, such as bearings, electrical contacts and switches, superconductors, and Giant Magnetoresistive (GMR) materials. However, it is challenging to effectively control the diffusional and colliding growth of immiscible minority droplets in an immiscible alloy during cooling in order to obtain a uniform dispersion of micrometer-sized or nanometer-sized minority phases in the alloy liquids and/or in the solids.

For an immiscible alloy, above the miscibility gap the alloy components are completely miscible as a single solution. If this single phase liquid is cooled down into the miscibility gap, the single phase liquid becomes unstable, nucleating and then separating into two liquid phases with distinct properties. The diffusion coefficient in alloy liquids is generally very high and, thus, after nucleation, the minority liquid droplets can grow very rapidly to become large droplets, which are prone to coagulation (colliding growth) and segregation.

Conventional techniques for forming two-phase alloys utilize a rapid cooling rate to reduce the time for the diffusional and colliding growth of the minority liquid phases. Unfortunately, a high temperature gradient during rapid cooling generally induces severe thermo-capillary forces that push the droplets to the hotter region, making uniform dispersion and colliding growth control of the minority droplets extremely difficult to achieve. Moreover, the use of high cooling rates restricts the size and complexity of the fabricated products, severely limiting their penetration into technical applications.

SUMMARY

Immiscible alloy materials and methods for fabricating the immiscible alloy materials are provided.

In one embodiment, the immiscible alloy material comprises an immiscible alloy comprising a majority phase comprising a continuous matrix of a first inorganic material; and a minority phase comprising a plurality of particles of a second inorganic material dispersed in the majority phase, wherein the minority phase particles have an average diameter of no greater than about 20 µm; and nanoparticles comprise a thermally stable material coating the surfaces of the dispersed minority phase particles, wherein the nanoparticles have an average diameter of no greater than about 250 nm.

One embodiment of the methods of making the solid immiscible alloy materials comprises: forming a single-phase liquid solution comprising the first inorganic material and the second inorganic material at a temperature above the liquid miscibility gap for the immiscible alloy; introducing solid nanoparticles comprising a thermally stable material into the single-phase liquid solution while it is at a temperature above the liquid miscibility gap; cooling the liquid solution through the liquid miscibility gap, whereby the nanoparticles form a coating on liquid droplets of the minority phase that forms in a liquid matrix of the majority phase; and cooling the resulting material to a temperature below the solidus temperature, whereby the solid immiscible alloy material forms.

The first and second inorganic materials may comprise metals, metalloids or other high-temperature materials. The nanoparticles are thermally stable in the first and second inorganic materials and may be, for example, ceramics.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A. Phase diagram for immiscible alloy Al—Bi with miscibility gap ($L_1+L_2$ region). FIG. 1B. Schematic of the structure evolution during cooling in the absence of stabilizing nanoparticles. FIG. 1C. Growth control of droplets by nanoparticles during cooling of the immiscible alloy.

FIGS. 2A-2F show the distribution of the Bi phase in solidified Al—Bi alloys. SEM images of a pure Al20Bi alloy (FIG. 2A) and an Al20Bi alloy with 2 vol. % $TiC_{0.7}N_{0.3}$ nanoparticles (FIGS. 2B and 2C) cooled at cooling rate of 1 K/s. Bi diameter (FIG. 2D) and Bi area fraction (FIG. 2E) measured at different distances from the bottom of the sample. FIG. 2F. Bi diameter and area fraction measured at different distances from the center of the Al20Bi alloy with 2 vol. % $TiC_{0.7}N_{0.3}$ nanoparticles.

FIG. 3A. SEM image of a representative Bi droplet with $TiC_{0.7}N_{0.3}$ nanoparticle coating. FIG. 3B Zoom-in of the squared area in FIG. 3A. FIG. 3C. Schematic of the interfacial energy as a function of the nanoparticle position relative to the liquid-liquid interface.

FIG. 7 is a table showing the parameters used to calculate $k_{np}$ and f.

FIG. 8 is a table showing the parameters used for the theoretical calculation of Bi size.

DETAILED DESCRIPTION

Figure 3E:
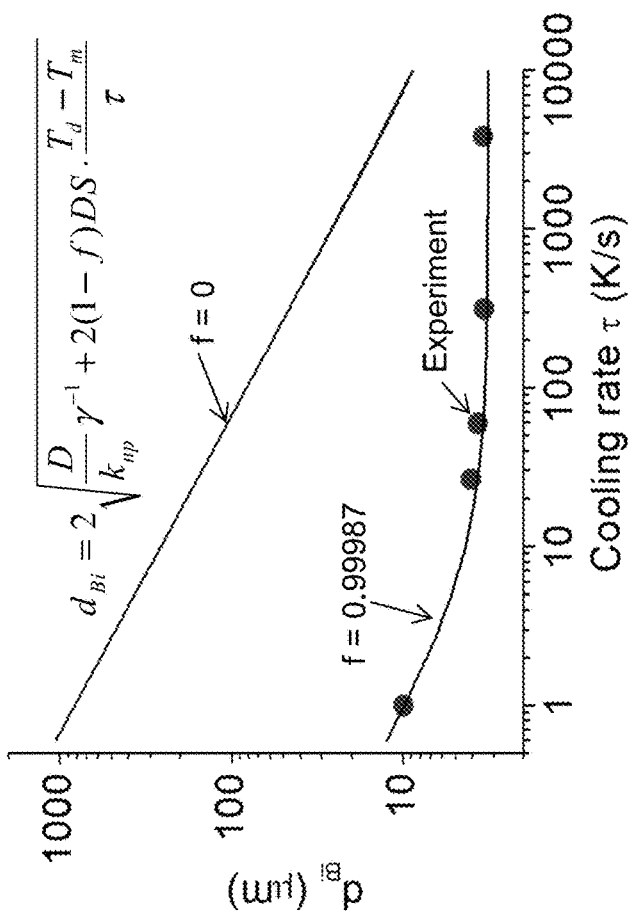
FIG. 3E. Bi droplet size as a function of cooling rate for Al-20Bi-2 vol. % $TiC_{0.7}N_{0.3}$.

Solid immiscible alloys and methods for making the solid immiscible alloys are provided. The microstructure of the immiscible alloys is characterized by a minority phase comprising a plurality of particles of an inorganic material dispersed in a majority phase comprising a continuous matrix of another inorganic material. The distribution of the minority phase particles in immiscible alloys made using the present methods can be highly uniform, in contrast to the non-uniform distribution of the minority phase particles in immiscible alloys fabricated using conventional methods, in which gravity induces a significant amount of particle sedimentation and/or thermocapillary forces induce segregation before the solidification of the alloy. The present methods utilize nanoparticles to control both collisional growth (via coalescence) and diffusional growth of the minority phase particles in the matrix during the formation of the alloy microstructure. As a result, the size of the minority phase particles can be carefully controlled during alloy formation.

Immiscible alloys have a phase diagram characterized by the presence of a liquid miscibility gap in which two liquid phases do not mix due their low solubilities in one another. In the miscibility gap, the majority phase forms a continuous liquid phase and the minority phase forms liquid droplets dispersed in the majority phase. By way of illustration, FIG. 1A shows the phase diagram for Al—Bi. In this phase diagram, the miscibility gap is the region labeled ($L_1+L_2$). Above the miscibility gap, the alloy components are miscible and form a single-phase liquid solution. When this single-phase liquid solution is cooled down into the miscibility gap, it becomes unstable and separates into two separate phases.

Immiscible alloys can be composed of a variety of high-temperature and low-temperature inorganic materials. As used herein, the phrase high-temperature inorganic material refers to an inorganic material that has a melting point of at least about 100° C. More typically, the high-temperature inorganic materials have a melting point of at least about 300° C. This includes inorganic materials having melting points of at least 500° C. and at least 1000° C.

High-temperature inorganic materials include metals, metal alloys (including alloys of metal and metalloid elements), intermetallic compounds (i.e., compounds formed of two or more metals) and ceramics, including both oxide and non-oxide ceramics (e.g., carbides, nitrides, borides and silicides). Suitable alloys include binary and ternary and other, higher multicomponent alloys. The majority phase of the immiscible alloys can be (or can comprise), for example, metals, such as aluminum, copper, gallium, zinc, iron or nickel. The minority phase can be (or can comprise) such elements as bismuth, lead, silver, cadmium or silicon. Thus, the immiscible alloy can be an aluminum-based alloy, such as Al—Bi, Al—Pb, Al—In or Al—Si, in which aluminum forms the majority phase. The amount of minority phase in the alloys can vary over a broad range. For example, the minority phase may account for one, or even less than one, weight percent (wt. %) of the alloy or only a few weight percent. However, in some alloys, the minority phase may account for up to 10 wt. %, up to 20 wt. %, up to 30 wt. %, or more of the alloy.

The stabilizing nanoparticles are composed of thermally stable inorganic materials. As used herein, the phrase thermally stable material refers to a material that remains a solid at a temperature above the miscibility gap of the immiscible alloy in which it is dispersed. The thermally stable material can be, for example, a ceramic, a metal, a metal alloy or an intermetallic. Suitable ceramics include oxides, carbides, borides, nitrides and silicides. Specific examples include $TiCN$, $SiC$, $TiB_2$, $ZrO_2$, and $Al_2O_3$. In order to provide a diffusion control coating at the interface between the majority and minority phases, it is desirable that the material selected for the nanoparticles have sufficient wettability in the material of both alloy phases. Thus, the thermally stable material may be selected such it has a wetting angle of around 90° (such as from 20°-160°) on the liquid phase of each material in the presence of the other liquid material. This includes embodiments in which the thermally stable material is selected such that it has a wetting angle of about 100° on the liquid phase of each material in the presence of the other liquid material.

As used herein, the term nanoparticle refers to a particle whose smallest cross-sectional dimension is no greater than 1000 nm. A typical nanoparticle in the present materials will have a smallest cross-sectional dimension of no greater than about 500 nm and more typically, no greater than about 150 nm. Moreover, although nanoparticles having a smallest cross-sectional dimension at the larger end of the size range may be present, the distribution of nanoparticles in the alloy material has a significantly lower average smallest dimension (as determined from the smallest cross-sectional dimension for each nanoparticle in the distribution). Thus, in some embodiments, the distribution of nanoparticles in the alloy material has an average smallest dimension of no greater than about 250 nm. This includes embodiments in which the distribution of nanoparticles has an average smallest dimension of no greater than about 200 nm, an average smallest dimension of no greater than about 150 nm, or an average smallest dimension of no greater than about 100 nm. For example, in some embodiments the average smallest dimension for the nanoparticles in the distribution is in the range from about 10 to about 100 nm. In some embodiments, for example in embodiments in which the nanoparticles are spherical or substantially spherical, the largest dimensions of the nanoparticles (or the average largest dimension for the distribution of nanoparticles) also fall within the ranges cited above.

The nanoparticles may have a wide range of morphologies. For example, the nanoparticles may be spherical or substantially spherical, elongated (e.g., nanorods or nanowires), disc-shaped, or sheet-shaped (e.g., in the form of thin flakes).

The concentration of nanoparticles in the immiscible alloy should be sufficient to provide a continuous or substantially continuous coating over the surfaces of the minority phase particles. Although an excess of nanoparticles can be used, any excess should be minimized to avoid unnecessary expense and/or a negative impact on alloy properties. In some embodiments of the alloy materials, the nanoparticles account for no greater than about 10 vol. % of the alloy material, based on the total volume of the majority phase, the minority phase and the nanoparticles. This includes embodiments in which the nanoparticles account for no greater than about 5 vol. % (e.g., from about 0.1 to about 5 vol. %, including from about 1 to about 5 vol. %).

FIG. 1B illustrates the formation of an immiscible alloy in the absence of stabilizing nanoparticles. As shown in panel (a), above the miscibility gap, the material exists as a single-phase liquid solution 102 (represented by a star in the phase diagram of FIG. 1A). However, as the temperature of the system is lowered along the solid vertical line in the phase diagram, nucleation begins (panel (b)) and the inorganic materials of the alloy separate into a continuous majority matrix phase 104 in which droplets of a discontinuous minority phase 106 are dispersed. These droplets continue to grow in size (panel (c)) via diffusional growth, where the droplet growth rate is controlled by the rate at which the minority phase material diffuses through the majority phase material. Eventually, the droplets begin to grow through collisional growth (panel (d)), whereby the droplets collide and coalesce into larger droplets 108. Unimpeded, these growth processes occur very rapidly and result in the formation of relatively large droplets that tend to undergo sedimentation, such that the density of the minority phase of the immiscible alloys is significantly greater at the bottom of the alloy sample.

FIG. 1C illustrates the use of nanoparticles as collisional and diffusional growth control agents during the alloy solidification process. Again, initially the material exists as a single-phase liquid solution 202 (panel (a)). However, in the present methods, the stabilizing nanoparticles 203 are added to the solution while it is above the miscibility gap. When the material is cooled into the miscibility gap, droplets of the minority phase 206 begin to separate from the inorganic material of the majority phase matrix 204 (panel (b)). Now, however, the nanoparticles spontaneously assemble at the interfaces between the growing minority phase droplets and the majority phase matrix material to form a coating 207 on the droplets, as depicted in panel (c). As a result, diffusional transport is restricted, or even completely blocked, and droplet 206 size is reduced relative to the droplet size in the absence of the nanoparticle coating. Moreover, as shown in panel (d), nanoparticle coating 207 also serves as a barrier against droplet coalescence by introducing a capillary pressure in the liquid film between approaching nanoparticle-coated droplets, thereby further restricting the size of droplets 206.

Using the present methods, droplet size can be controlled such that it remains below the size at which gravitational and thermocapillary forces become significant and create a non-uniform distribution. This is the case even for slow cooling rates. In fact, the present methods can be carried out at cooling rates much lower than those used in rapid cooling techniques, which are typically on the order of hundreds of K/s. For example, in some embodiments of the methods, cooling is carried out at a rate of no greater than 500 K/s. This includes embodiments in which cooling is carried out at a rate of no greater than 100 K/s, further includes embodiments in which cooling is carried out at a rate of no greater than 10 K/s, still further includes embodiments in which cooling is carried out at a rate of no greater than 2 K/s and still further includes embodiments in which cooling is carried out at a rate of no greater than 1 K/s. The use of such low cooling rates is advantageous because it reduces the thermocapillary forces experienced by the minority phase droplets relative to those experienced by droplets at higher cooling rates. In addition, the low cooling rate enables the fabrication of larger and complex product by regular casting for wide production.

Notably, even when the present methods are carried out by adding the nanoparticles to the system in the miscibility gap (i.e., at a temperature at which the alloy exists as two distinct phases), the nanoparticles provide a more uniform distribution of the minority phase particles in the majority phase matrix relative to that provided by larger particles, such as particles having an average diameter of 1 μm or greater. This may be attributed to the formation by the nanoparticles of a more uniform and continuous coating on the minority phase droplets and, therefore, a more effective barrier against droplet coalescence.

The size of the minority particles in the immiscible alloy will depend on a number of factors, including the size and concentration of the nanoparticles and the concentration of the minority phase material in the alloy. In order to achieve a solid alloy with a highly uniform spatial distribution of minority phase particles, it is desirable to maintain a minority phase droplet size that is small enough to avoid significant droplet sedimentation on the time scale of the alloy solidification process. In some embodiments of the immiscible alloys, the average diameter of the distribution of minority phase particles is no greater than about 11 μm and no more than 1% of the minority phase particles have a diameter larger than 20 μm. This includes embodiments in which the average diameter of the distribution of minority phase particles is no greater than about 10 μm and no more than 1% of the minority phase particles have a diameter larger than 15 μm and further includes embodiments in which the average diameter of the distribution of minority phase particles is no greater than about 4 μm and no more than 1% of the minority phase particles have a diameter larger than 6 μm. For example, the average diameter of the distribution of minority phase particles may lie in the range from about 2 μm to about 10 μm. Because the particles may not be perfectly spherical or symmetric, the diameter of a particle may be measured as its longest cross-sectional dimension.

The solid immiscible alloys can have a highly uniform minority phase particle distribution. That is, the spatial distribution/density of minority phase particles in the alloy may be highly homogeneous when measured as a function of both the depth and width through the alloy sample, where depth and width represent two perpendicular dimensions extending through the sample. This is illustrated in FIGS. 2B-2F, as described in detail in the Example section. The uniformity of the minority phase particle distribution can be measured by the average diameter of the minority phase particles measured along the depth and width of the alloy and/or by the area fraction of the minority phase particles measured along the depth and width of the alloy. For example, in some embodiments of the immiscible alloys, the area fraction of the minority phase particles varies by no more than about ±5%, and in some embodiments no more than about ±3%, when measured along both the depth and the width dimensions of the sample with measurements taken at cross-sectional intervals of, for example, about 2 mm. This includes embodiments in which the area fraction of the minority phase particles varies by no more than about ±2%, as well as embodiments in which it varies by no more than about ±1%, when measured along both the depth and the width of the sample with measurements taken at cross-sectional intervals of, for example, about 2 mm. Similarly, in some embodiments of the immiscible alloys, the average diameter of the minority phase particles varies by no more than about ±3 μm when measured along both the depth and the width of the sample with measurements taken at cross-sectional intervals of, for example, about 2 mm. This includes embodiments in which the average diameter of the minority phase particles varies by no more than about ±2 μm, as well as embodiments in which it varies by no more than about ±1 μm, or by no more than about ±0.5 μm, when measured along both the depth and the width of the sample with measurements taken at cross-sectional intervals of, for example, about 2 mm. These uniform minority phase particle distributions can be maintained even over the dimensions of large alloy samples, including those with depth and width dimensions of at least 10 mm, at least 20 mm, at least 50 mm or at least 100 mm.

EXAMPLE

In this example, Al—Bi alloys were used as a model system for immiscible alloys to demonstrate the effectiveness of the present methods. The density difference between Al and Bi is very large (3.6:1), making it one of the most difficult immiscible alloys to process. This example shows that, by using thermally stable $TiC_{0.7}N_{0.3}$ nanoparticles (~80 nm), a uniform distribution of micron-sized minority Bi phase particles in an Al matrix can be formed using a cooling rate as low as about 1 K/s and a Bi concentration as high as 20 wt. % in the immiscible Al—Bi alloys.

Materials and Methods:

Melt preparation and nanoparticle dispersion: an Al—Bi melt was prepared by melting commercial pure aluminum (99.5%, AA1350) and bismuth (99.9%, Alfa Aesar) in an alumina crucible using an electrical resistance furnace. $TiC_{0.7}N_{0.3}$ nanoparticles with a diameter of less than 150 nm and an average diameter of about 80 nm were fed and dispersed into the molten metal by an ultrasonic cavitation based method as described in Y. Yang, J. Lan, X. C. Li, Study on bulk aluminum matrix nano-composite fabricated by ultrasonic dispersion of nano-sized SiC particles in molten aluminum alloy. *Mater. Sci. Eng. A*, 380, 378-383 (2004). A resistance heating furnace was used to heat the Al—Bi melt in an alumina crucible with a diameter of 36 mm. An inert gas protection system was used to protect the melt and nanoparticles from oxidation by injecting argon through two nozzles. A nanoparticle feeding system was used to feed nanoparticles into the melt. In this study, a double-capsulate feeding method was used. Nanoparticles were wrapped with 0.0127 mm thin Al foil (alloy 1000), and then the Al foil was rolled into a rod shape with a diameter of about 6 mm (making the first capsule). The Al foil rod, containing the nanoparticles, was wrapped again with another thin Al foil (alloy 1100) with dimensions of 355.6 mm×152.4 mm×0.0254 mm (making the second capsule). The second Al foil made the nanoparticles discharge into the melt gradually, resulting from a gradual melting of the thicker wall of the capsule. The ultrasonic processing system included an ultrasonic probe, booster, and transducer. The ultrasonic probe, made of niobium alloy C103 with a diameter of 12.7 mm and a length of 175 mm, was attached to the booster (Sonicator 3000, Misonix Inc.), which was mounted in the transducer working under a frequency of 20 kHz and a maximum 600 W power output. When the Al—Bi alloy was melted in the alumina crucible at 973 K, the tip of the niobium ultrasonic probe was inserted to a depth of about 6 mm into the melt. Ultrasonic vibration with a frequency of 20 kHz and a peak-to-peak amplitude of 50 μm was generated from the transducer. Then the preheated nanoparticles (at 423 K for one hour) were added into the melt with the double-capsulate feeding method during ultrasonic processing. Each double-capsulate could carry about 1 vol. % of nanoparticles into the melt. It took 15 minutes to disperse the nanoparticles released from one capsulate by the ultrasonic processing. After feeding and dispersing the nanoparticles at 973 K, the ultrasonic probe was lifted out of the melt. Then the melt was heated to 1183 K (above the miscibility gap for this composition). To make sure the nanoparticles were well dispersed before cooling, the melt was treated again by ultrasonic processing for 15 minutes at 1183 K.

Solidification and cooling rate measurement: After ultrasonic processing, the ultrasonic probe was lifted out of the melt. Then the crucible was taken out of the furnace. The Al—Bi melt with nanoparticles was cooled down inside the crucible in air. For comparison, the pure Al—Bi alloy was also prepared under the same conditions without nanoparticles. The cooling rate was measured by inserting a thermocouple inside the melt during cooling. The cooling rate before solidification was about 1 K/s.

Structure characterization: After solidification, the distribution of the minority Bi phase was studied by FESEM (field-emission scanning electron microscope, Zeiss LEO 1530) using backscattering electron imaging. The area fraction and average size of the Bi phase were calculated from the backscattering images using the software Image J. The nanoparticle distribution and bonding with the matrix were investigated by FESEM and high resolution transmission electron microscopy (HRTEM, FEI Titan Aberration-corrected (S)TEM). Due to a preferential etching of Bi by both electropolishing and ion milling, the samples for HRTEM were cut by a focused ion beam mill (FIB, Zeiss 1500 XB CrossBeam Workstation) to reduce the preferential etching.

Sample preparation procedure for nanoparticle distribution study: Interfacial assembly of the TiCN nanoparticles in the solidified samples was studied by FESEM. The samples were cleaned by low angle ion milling for 2 hours with milling parameters of 4 kv voltage, 4 mA current, 15° milling angle, and 360° stage rocking angle. After ion milling, only embedded TiCN nanoparticles remained on the sample, which was confirmed by electron energy-dispersive X-ray spectroscopy (EDS).

Figure 5:
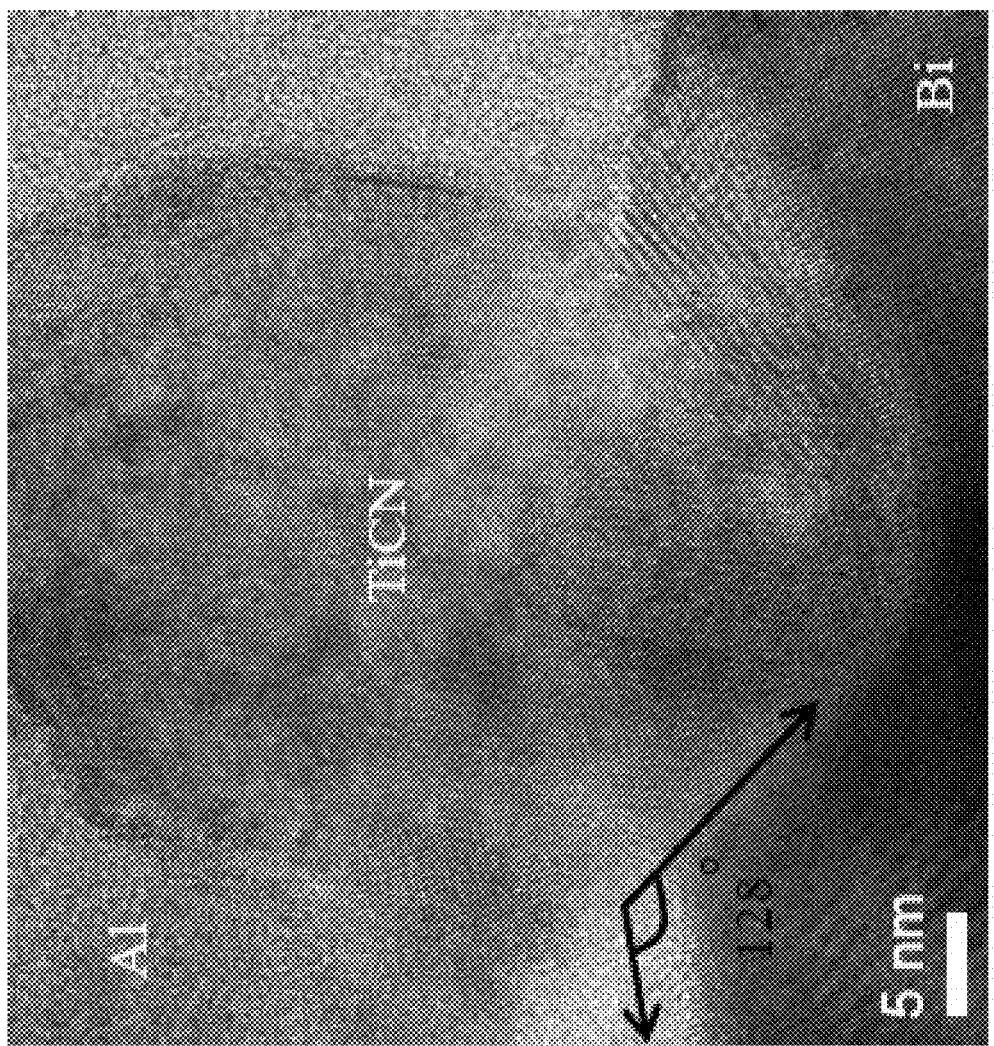
FIG. 5. TEM image of $TiC_{0.7}N_{0.3}$ nanoparticle at Bi and Al interface in an Al—Bi alloy. The wetting angle of 128° was measured from the triple junction.

Wetting angle determination: To determine the wetting angle of TiCN nanoparticles with Bi in the environment of Al a TEM sample was cut from the boundary between Bi and Al by FIB and the triple junction formed by the TiCN nanoparticle, Bi and Al was observed by HRTEM. The wetting angle of TiCN nanoparticles with Bi in the environment of Al, before completed solidification, was estimated from the geometry of the triple junction, as shown in FIG. 5.

The dispersion and size of the Bi phase particles in the solidified samples was analyzed. FIG. 2A shows the backscattering scanning electron microscope (SEM) images taken from the bottom part of the solidified monolithic Al-20 wt. % Bi (hereafter Al-20Bi) alloy. As expected, the Bi phase settled down to the bottom, forming a thick layer of Bi with about 12 vol. % of precipitated Al phase. The thickness of the Bi layer on the bottom is about 2.5 mm, accounting for about 90% of the total Bi in the sample. This illustrates that the Bi in the monolithic Al-20Bi alloy segregates severely during solidification. However, when ultrasonic processing was used to disperse 2 vol. % $TiC_{0.7}N_{0.3}$ nanoparticles into the Al-20Bi alloy, no sedimentation was observed, as shown in the SEM images of FIGS. 2B and 2C. The distribution of the Bi phase in the pure alloy and in samples with 1.0 and 2.0 vol. % of $TiC_{0.7}N_{0.3}$ nanoparticles versus the distance from the bottom of the samples was also analyzed, as shown in FIGS. 2D and 2E for average diameters and area fractions, respectively. With the incorporation of only 1.0 vol. % of $TiC_{0.7}N_{0.3}$ nanoparticles, the distribution of Bi was improved dramatically. With 2.0 vol. % of $TiC_{0.7}N_{0.3}$ nanoparticles, both the size and area fraction of Bi were very uniform throughout the sample. The average size of Bi droplets was about 7.5 μm. To check if the thermocapillary force induced non-uniformity, the distribution of Bi phase particles from the center to the outside, along the horizontal (width) direction in the Al-20Bi alloy sample with 2 vol. % $TiC_{0.7}N_{0.3}$ nanoparticles, was analyzed. The results, as shown in FIG. 2F, demonstrated that the Bi phase was distributed uniformly along the horizontal direction, indicating that the thermocapillary force induced little pushing of Bi droplets to the center. The uniform distribution of micrometer-sized Bi droplets was observed throughout the samples of the Al-20Bi alloy with 2 vol. % $TiC_{0.7}N_{0.3}$, which were produced under a slow cooling rate of 1K/s.

To study the interfacial assembly of the nanoparticles, the distribution of the TiCN nanoparticles in the solidified samples was investigated by FESEM. As shown in FIGS. 3A and 3B, the nanoparticles form a thin layer coating on a representative Bi droplet.

The stability of the solid nanoparticles assembled at the liquid/liquid interface was determined by the Brownian motion energy and the energy needed to remove the particles from the interface to the bulk liquid phases. The energy needed to remove a particle from the interface to the bulk liquid phases is $$\Delta G = \pi r^2 \sigma (1 \pm \cos \theta)^2, \quad (1)$$

where r is the radius of the particle, σ is the interfacial energy between the two liquids, θ is the contact angle, measured through the liquid 1 on the solid particle in the environment of liquid 2, and sign '+' refers to particle removal into the bulk liquid 2 phase, while sign '−' refers to the removal of the particle into the bulk liquid 1 phase. (See, G. Kaptay, On the equation of the maximum capillary pressure induced by solid particles to stabilize emulsions and foams and on the emulsion stability diagrams. *Colloids Surf., A,* 282, 387-401 (2006).) The Brownian motion energy ($E_b$) is $$E_b = kT/2, \quad (2)$$

where k is Boltzmann constant ($1.3806503 \times 10^{-23}$ m² kg s⁻² K⁻¹) and T is the absolute temperature of the liquids. In the system of Al—Bi alloy with TiCN particles, the average nanoparticle radius, r, is about 40 nm, interfacial energy σ between Al and Bi liquid is about 16 mN/m at 1173 K, and T is about 1173 K. The wetting angle was experimentally estimated to be about 128°. Thus, the energy (ΔG) needed to remove the nanoparticle from the interface to the bulk liquid phases was estimated to be about $1 \times 10^{-17}$ J, which is more than 3 orders of magnitude higher than the Brownian motion energy $E_b$, $8 \times 10^{-21}$ J, of the particles at 1173 K. This indicates that a deep interfacial energy well effectively traps the TiCN nanoparticles at the interfacial region between the Bi and Al phases, as shown schematically in FIG. 3C.

The diffusional growth of the Bi droplets with and without the nanoparticle coating was also investigated. A detailed description of the theoretical model used to investigate diffusional growth is provided in the appendix section, below. For convenience, a summarized description is presented in the following discussion.

Assuming the Bi droplets nucleate and grow only by diffusional transport of Bi, the diameter of Bi can be determined by $$d_{Bi} = 2\sqrt{2DSt}. \quad (3)$$

where D is the diffusion coefficient, t is cooling time in the immiscible region, and S is supersaturation, a temperature dependent parameter. (See, J. Alkemper, L. Ratke, Concurrent Nucleation, Growth and Sedimentation During Solidification of Al—Bi Alloys. *Z. Metallkd.,* 85, 365-371 (1994).) The average S can be calculated by $$S = \frac{1}{2} \frac{C_0 - C_1}{C_2 - C_0}, \quad (4)$$

where $C_0$ is the Bi concentration in the matrix, $C_1$ and $C_2$ are the concentrations of Al rich liquid and Bi rich liquid at monotectic temperature, respectively.

By using Equation (3), the estimated average Bi droplet size through diffusional growth only would be about 821 μm for pure Al-20Bi, which is two orders of magnitude larger than the experimental value of 7.5 μm for Al-20Bi-2 vol. % TiCN. This clearly indicates that it would be impossible to obtain micrometer-sized Bi droplets at a low cooling rate (about 1 K/s) for pure Al-20Bi alloy without effective control of diffusional growth. Thus, the nanoparticles greatly reduced the diffusional growth of the Bi droplets during cooling/solidification.

Assuming a Langmuir adsorption model for nanoparticles to assemble on the surface of a droplet, a theoretical model was constructed to study the remarkable diffusional growth control of Bi droplets by TiCN nanoparticles. In the model, f is defined as the diffusional blocking efficiency by the nanoparticle coating, $C_{np}$ as the concentration of nanoparticles, and $t_{np}$ as the characteristic time (time constant) for full nanoparticle coverage on the droplets. $t_{np}$ is a function of the size, density and volume percentage of nanoparticles, nanoparticle stacking factor, nanoparticle adsorption efficiency, and melt temperature. $C_{np}$ and $t_{np}$ can be related by a constant $k_{np}$ as $$t_{np} = k_{np}^{-1} \cdot C_{np}^{-1} = \frac{1}{k_{np} C_{np}}. \quad (5)$$

When $t_{np} \ll t$, $$R \approx \sqrt{2DSt_{np} + 2(1-f)Dst} \sqrt{\frac{D}{k_{np}} \cdot \frac{S}{C_{np}} + 2(1-f)Dst}. \quad (6)$$

Constant $k_{np}$ and f were estimated experimentally by casting the Al-20Bi-2 vol. % TiCN melt to a copper wedge mold to cool the alloy melt at different cooling rates. The $k_{np}$ and f were determined to be approximately 11340 s⁻¹ and 0.99987, respectively. The $t_{np}$ for Al-20Bi-2 vol. % TiCN can be estimated as about 4.4.0 ms. The short $t_{np}$ shows that the nanoparticles can rapidly wrap up the droplets within a few milliseconds. The remarkably high diffusion blocking efficiency, f, confirms that the nanoparticle coating is effective to control diffusional growth.

Defining $\gamma = S/C_{np}$, the dependence of the Bi droplet size on γ was experimentally investigated by varying the volume percentages of nanoparticles ($C_{np}$) and Bi concentration. Using the $k_{np}$ and f experimentally determined from Al-20Bi-2 vol. % TiCN samples, the Bi droplet size was determined theoretically for the experimentally studied γ. The theoretical values matched the experimental ones very well (FIG. 3D). To show the influence of diffusion blocking efficiency on droplet sizes, the Bi droplet diameter was also calculated theoretically with f=0 (no nanoparticle and no diffusional growth control) and f=1 (assuming the nanoparticle coating totally blocked the diffusion). The data show that the nanoparticle-enabled diffusional growth control obtained the remarkably small Bi droplets (FIG. 3D).

Figure 3D:
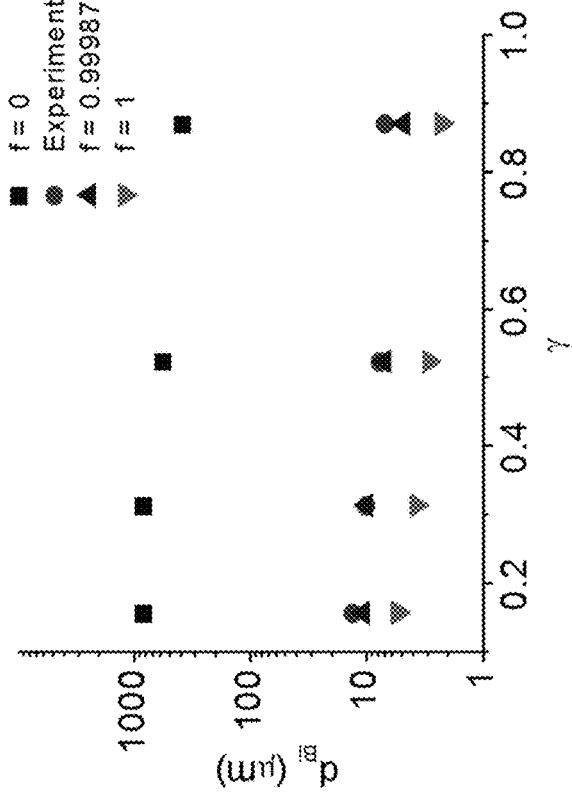
FIG. 3D. Bi droplet size as a function of $\gamma = S/C_{np}$ under 1K/s cooling.

Furthermore, FIG. 3E shows the dependence of the experimental and calculated Bi droplet diameters on cooling rates for Al-20Bi alloy. The cooling time was calculated by $t = (T_d - T_m)/\tau$, where $T_d$ and $T_m$ are the decomposition temperature and monotectic temperature, respectively, and τ is the cooling rate. Without diffusional control (i.e. f=0), the droplet size was large and strongly depended on the cooling rate. However, with a nanoparticle enabled diffusional barrier (f=0.99987), the droplet size was orders of magnitude smaller, and depended little on cooling rates when the cooling rate was higher than 50 K/s (corresponding to an approximate cooling time $t=10^3 \, t_{np}$, shown in FIG. 3E). The average Bi droplet sizes depend on the competitive nature between $t_{np}$ and $(1-f)t$. With a remarkably high diffusion blocking efficiency of f=0.99987 in this study, at a cooling rate that will yield a cooling time of about 40 s (approximately 6 K/s in Al-20Bi), $t_{np}$ starts to dictate the Bi particle size, effectively eliminating the need for high cooling rates demanded by conventional processing methods.

Figure 4A:
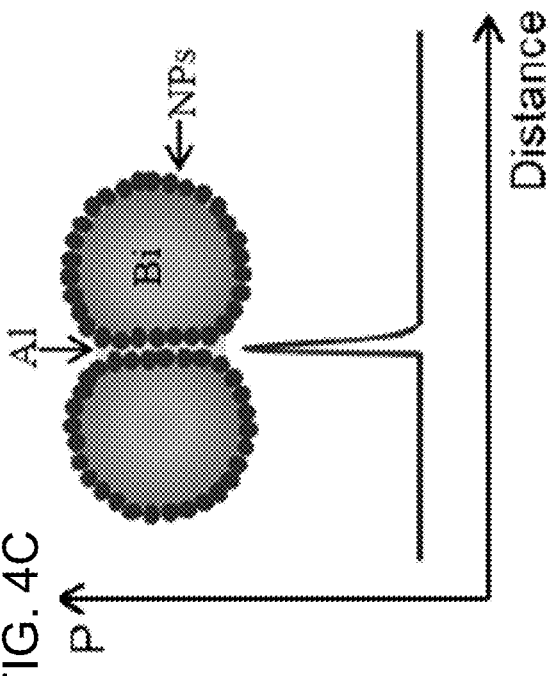
FIG. 4A. SEM image of a Bi droplet cluster.
Figure 4C:
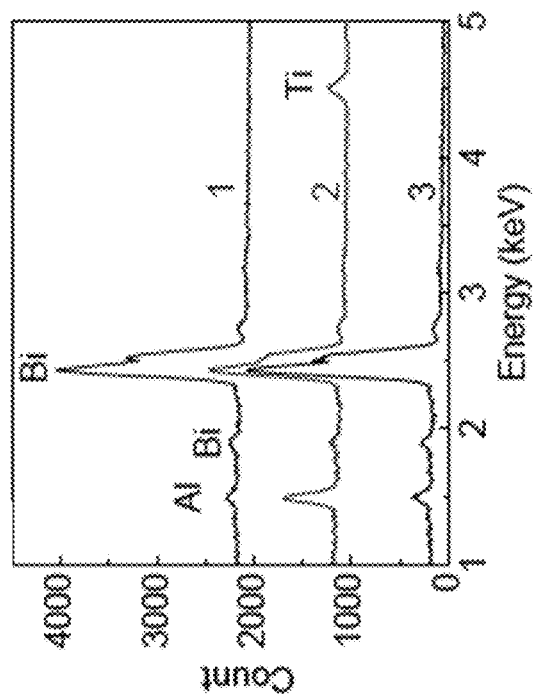
FIG. 4C. Schematic of the capillary pressure in the liquid film between two colliding nanoparticle-coated droplets.
Figure 4B:
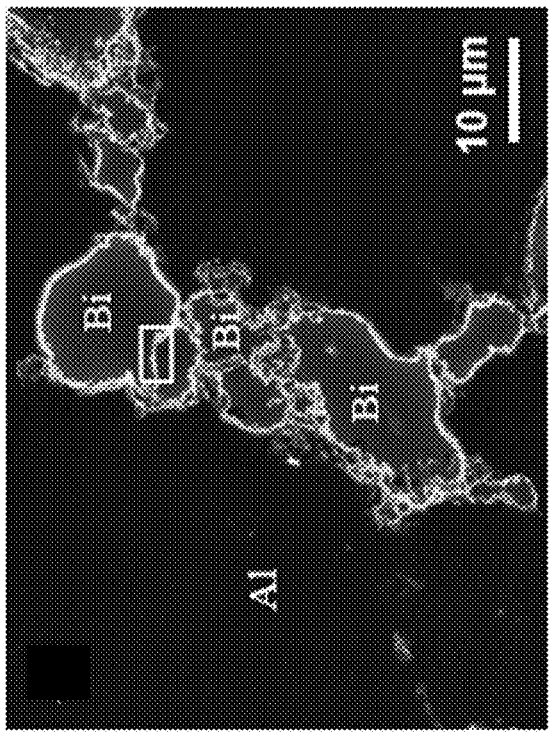
FIG. 4B. zoom-in of the squared area in FIG. 4A.
Figure 4D:
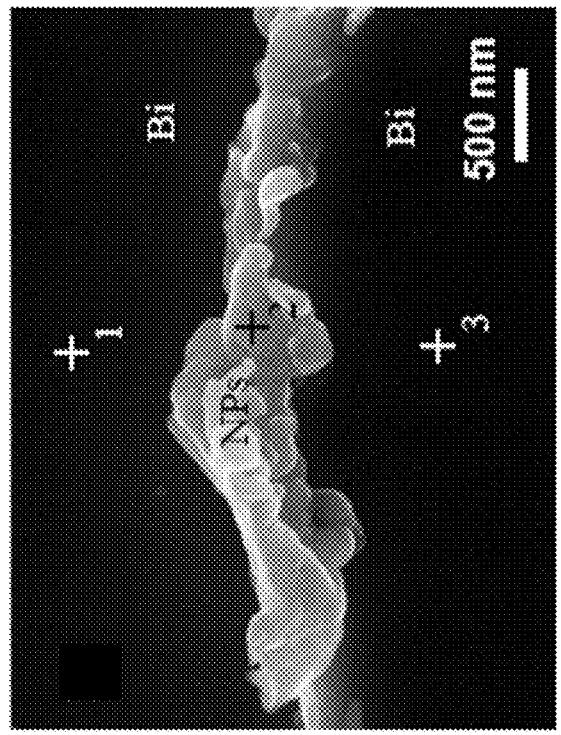
FIG. 4D. EDS of the interface region between two Bi droplets.

The effectiveness of nanoparticles at controlling colliding growth was also investigated. The SEM images of FIGS. 4A and 4B show that the TiCN nanoparticles trapped at the surface of Bi droplets can stabilize the Bi droplets against coagulation when two Bi droplets collide with each other, induced by hydrodynamic motions. Even though some Bi droplets were pushed against each other during solidification, their nanoparticle coatings were able to resist the coagulation, as shown in FIG. 4A. The SEM image and energy dispersive spectroscopy (EDS) analysis of the boundary region between the two small Bi droplets validated that a thin layer of nanoparticle-stabilized Al separated the two Bi droplets against coagulation, as shown in FIG. 4D. Interestingly, some submicrometer-sized Bi droplets, located along the Al grain boundary, were also stabilized by nanoparticle coatings.

Past studies showed that solid particles could stabilize the thin liquid film between two droplets. (See, G. Kaptay, On the equation of the maximum capillary pressure induced by solid particles to stabilize emulsions and foams and on the emulsion stability diagrams. *Colloids Surf., A*, 282, 387-401 (2006) and N. D. Denkov, I. B. Ivanov, P. A. Kralchevsky, D. T. Wasan, A Possible Mechanism of Stabilization of Emulsions by Solid Particles. J. Colloid Interface Sci., 150, 589-593 (1992).) The pressure needed to break the thin liquid film depends on size and packing of particles, wetting angle, and liquid/liquid interfacial energy. (See, G. Kaptay, On the equation of the maximum capillary pressure induced by solid particles to stabilize emulsions and foams and on the emulsion stability diagrams. *Colloids Surf., A*, 282, 387-401 (2006) and N. D. Denkov, I. B. Ivanov, P. A. Kralchevsky, D. T. Wasan, A Possible Mechanism of Stabilization of Emulsions by Solid Particles. J. Colloid Interface Sci., 150, 589-593 (1992).) Here it was assumed that the Bi droplets were fully covered by a dense single layer of nanoparticles. When two Bi droplets approach close to each other, a nanoparticle double layer would form to stabilize the thin liquid Al film between them. The pressure generated by the double layers of closely packed nanoparticles to stabilize the thin liquid Al film can be determined by $$p = a\frac{2\sigma}{r}(\cos\theta + z), \tag{7}$$

where r is the radius of the particles, $\sigma$ is the interfacial energy between the two liquids, $\theta$ is the contact angle, a and z are −4.27 and −0.405, respectively, for a closely packed double layer when $\theta > 90°$. (See, G. Kaptay, On the equation of the maximum capillary pressure induced by solid particles to stabilize emulsions and foams and on the emulsion stability diagrams. *Colloids Surf., A*, 282, 387-401 (2006).) Using parameters for the Al—Bi—TiCN nanoparticle system, the pressure was estimated to be 3.48 MPa in the liquid Al film between the approaching Bi droplets, thus effectively resisting colliding growth (coagulations), as shown schematically in FIG. 4C.

Appendix: Theoretical Model for Nanoparticle-Induced Diffusional Growth Control

Assuming the Bi droplets nucleate and grow only by diffusional transport of Bi, the diameter of Bi can be determined by $$d_{Bi} = 2\sqrt{2DSt}. \tag{A1}$$

where D is the diffusion coefficient, t is cooling time in the immiscible region, and S is supersaturation given by $$S = \frac{C_0 - C_\alpha}{C_\beta - C_0} \tag{A2}$$

where $C_\alpha$ is the Bi concentration at the interface between the growing Bi droplet and Al matrix, $C_\beta$ is the Bi concentration in the Bi droplets, and $C_0$ is the Bi concentration in the matrix. S is a temperature dependent parameter: S is zero when the cooling just enters the immiscibility gap; when at the monotectic temperature, S can be calculated by $$S = \frac{C_0 - C_1}{C_2 - C_0}, \tag{A3}$$

where $C_1$ and $C_2$ are the concentrations of Al⁻ rich liquid and Bi⁻ rich liquid at the monotectic temperature, respectively. The average S can thus be calculated by $$S = \frac{1}{2}\frac{C_0 - C_1}{C_2 - C_0}. \tag{A4}$$

The following assumptions were made to simplify the study:

Nanoparticles are uniformly dispersed above the immiscibility gap;

Bi droplets nucleate and grow only by diffusional transport;

No coagulation between the Bi droplets occurs; and

A densely packed single layer of nanoparticles covers the Bi droplets.

Since the supersaturation $$S = \frac{C_0 - C_\alpha}{C_\beta - C_0} \ll 1,$$

the growth rate of Bi is $$\frac{dR}{dt} = D \cdot S \cdot \frac{1}{R} \tag{A5}$$

where R is the radius of Bi droplets, t is time, and D is the diffusion coefficient of Bi in the liquid Al-20Bi alloy. If a constant S is assumed during phase transformation, then $$\frac{RdR}{dt} = DS. \tag{A6}$$

If the nanoparticle surface coverage on the Bi droplets is defined as $\theta$ and the efficiency of the nanoparticle coating to block the diffusion growth of droplets is defined as f (called diffusional blocking efficiency hereafter), then $$\frac{RdR}{dt} = DS(1 - f\theta). \quad (A7)$$

Figure 6:
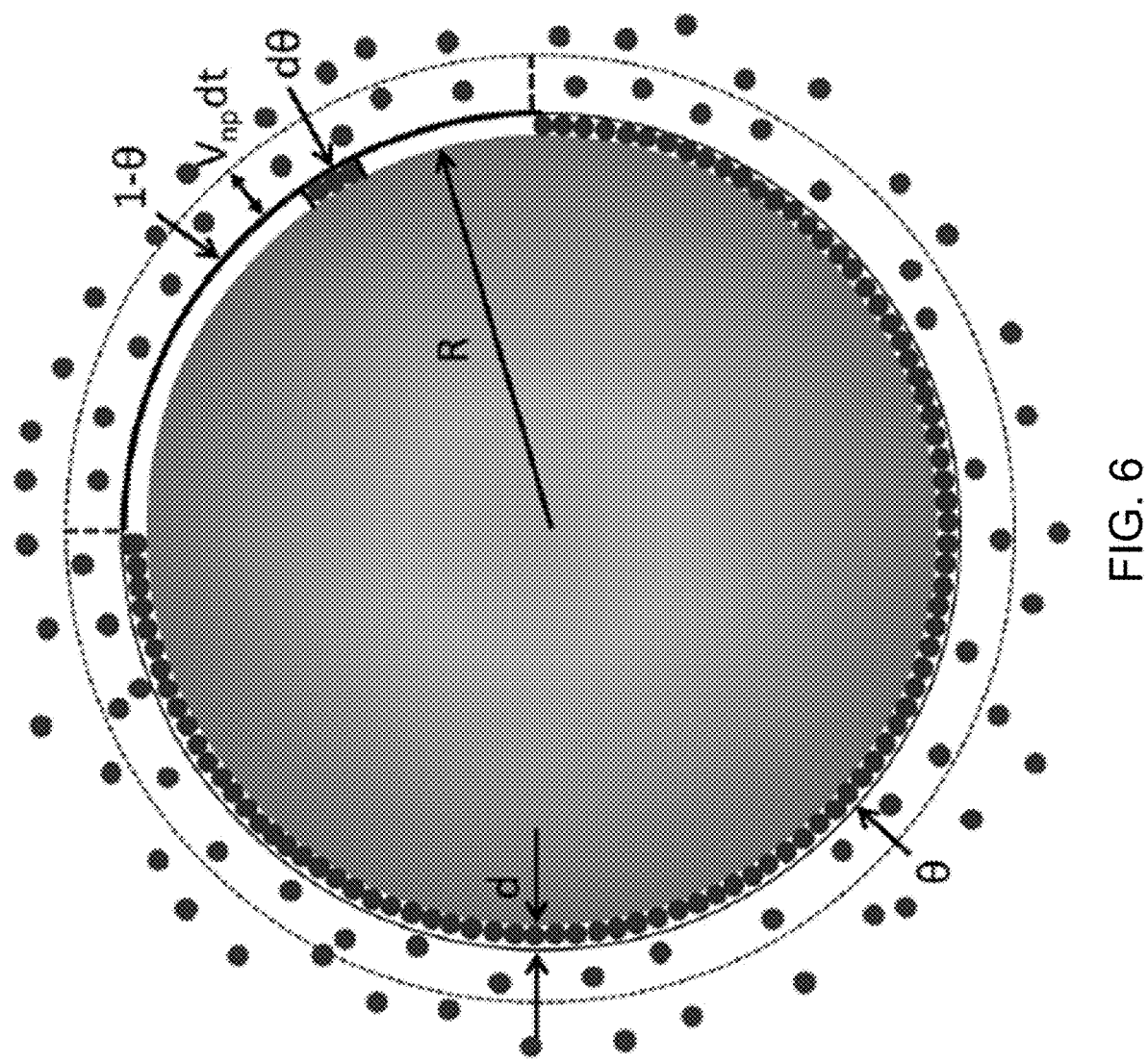
FIG. 6. Schematic of a theoretical model for nanoparticle-induced diffusional growth control.

To obtain θ, assume R>>d, a very densely-packed nanoparticle layer (due to various sizes of nanoparticles) with an effective packing factor φ, d is the layer thickness for the nanoparticle coating. Assuming a Langmuir adsorption model, the additional nanoparticle coverage, dθ, can be attributed to those nanoparticles that could arrive at the interface within a short period, dt, under Brownian motion. To simplify the case, dθ represents the accumulative surface coverage by these additional nanoparticles during dt. The schematic of the model is shown in FIG. 6. The model can then be described as $$4\pi R^2 d \cdot \varphi \cdot d\theta = 4\pi R^2 (1-\theta) \cdot \delta \cdot v_{np} C_{np} dt \quad (A8)$$

where $V_{np}$ is the kinetic velocity of nanoparticles at temperature T, $C_{np}$ is the concentration of nanoparticles, δ is nanoparticle adsorption efficiency.

$$\frac{d\theta}{dt} = \frac{\delta v_{np} C_{np}}{\varphi d} \cdot (1 - \theta) \quad (A9)$$

A time constant $t_{np}$ can be defined as $$t_{np} = \frac{\varphi d}{\delta v_{np} C_{np}}. \quad (A10)$$

The Brownian velocity of a single nanoparticle can be calculated by $$\frac{1}{2} m v_{np}^2 = \frac{1}{2} k_B T. \quad (A11)$$

Then $$v_{np} = \sqrt{\frac{k_B T}{m}} = \sqrt{\frac{k_B T}{\frac{4}{3}\pi \frac{d^3}{8}\rho}} = \sqrt{\frac{6k_B T}{\pi d^3 \rho}} \quad (A12)$$

where m is the mass of nanoparticles, $k_B$ is the Boltzmann constant, and ρ is the density of the nanoparticle. Thus, $$t_{np} = \frac{\varphi d}{\delta v_{np} C_{np}} = \frac{\sqrt{\pi}\, \varphi d^{\frac{5}{2}} \rho^{\frac{1}{2}}}{\delta \sqrt{6 k_B T}} C_{np}^{-1}. \quad (A13)$$

From Equation (A13), $t_{np}$ is a function of the size, density and volume percentage of nanoparticles, nanoparticle stacking factor, nanoparticle adsorption efficiency, and melt temperature.

The Equation (A9) becomes $$\frac{d\theta}{dt} = \frac{1}{t_{np}}(1 - \theta). \quad (A14)$$

The solution of θ can be written as $$\theta = 1 - e^{\frac{1}{t_{np}}t}. \quad (A15)$$

By combining Equations (A7) and (A15), $$\frac{RdR}{dt} = DS \cdot \left(1 - f + f e^{\frac{1}{t_{np}}t}\right). \quad (A16)$$

Assuming constant D and S during the diffusional growth, it becomes $$R^2 = 2DS \cdot t_{np} \cdot \left(1 - e^{\frac{1}{t_{np}}t}\right) + 2DS(1 - f)t. \quad (A17)$$

A constant S can be assumed to be given by equation (A4).

Defining:

$$k_{np}^{-1} = \frac{\sqrt{\pi}\, \varphi d^{\frac{5}{2}} \rho^{\frac{1}{2}}}{\delta \sqrt{6 k_B T}}, \quad (A18)$$

from Equation (A13), $K_{np}$ would be a constant.

Then $$t_{np} = k_{np}^{-1} \cdot C_{np}^{-1} = \frac{1}{k_{np} C_{np}}. \quad (A19)$$

When $t_{np} \gg t$, $$R \approx \sqrt{2DS t_{np} + 2(1 - f)DSt} = \sqrt{\frac{D}{k_{np}} \cdot \frac{S}{C_{np}} + 2(1 - f)DSt}. \quad (A20)$$

Defining:

$$\gamma = \frac{C_{np}}{S}, \quad (A21)$$

then $$d_{Bi} = 2\sqrt{\frac{D}{k_{np}}\gamma^{-1} + 2(1 - f)DSt}. \quad (A22)$$

Equation (A22) only considers diffusional growth before the monotectic temperature. At and below the monotectic temperature, small Bi droplets may still form. But those Bi droplets formed at and after $T_m$ should not be counted so that the experimental data can be compared more accurately with the one predicted from Equation (A22). To properly exclude the small Bi droplets formed at and below the monotectic temperature, the Bi droplet size was checked in the monotectic alloy with 2 vol. % TiCN sample. Droplets smaller than the monotectic ones were excluded from the SEM images and only the Bi concentration at the immiscible region was considered in the comparison with the calculation in FIG. 3D.

Experimental determination of $k_{np}$, $t_{np}$ and f: To experimentally estimate $k_{np}$ and f, the Al-20Bi-2 vol. % TiCN melt was cast to a copper wedge mold to cool the alloy melt at different cooling rates. The cooling rate was calculated using an empirical equation from the thickness of the sample. (See, N. H. Pryds, X. Huang, The effect of cooling rate on the microstructures formed during solidification of ferritic steel. *Metall. Mater. Trans. A,* 31A, 3155-3166 (2000).) The values for $k_{np}$ and f were calculated from the droplet sizes obtained at different cooling rates using equation (A20). The parameters used to calculate $k_{np}$ and f are listed in table 1, which is presented in FIG. 7.

The calculated $k_{np}$ and f were about 11340 $s^{-1}$ and 0.99987 respectively. Using equation (A19), the calculated $t_{np}$ for Al-20Bi-2 vol. % TiCN was about 4.4.0 ms.

The parameters used for theoretical calculation of Bi size are shown in Table 2, which is presented in FIG. 8.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of making a solid immiscible alloy material comprising: an immiscible alloy having a majority phase comprising a continuous matrix of a first inorganic material and a minority phase comprising a plurality of particles of a second inorganic material dispersed in the majority phase; and nanoparticles comprising a thermally stable material coating the surfaces of the dispersed minority phase particles; the method comprising:

(a) forming a single-phase liquid solution comprising the first inorganic material and the second inorganic material at a temperature above the liquid miscibility gap for the immiscible alloy;

(b) introducing solid nanoparticles comprising a thermally stable material into the single-phase liquid solution while it is at a temperature above the liquid miscibility gap;

(c) cooling the liquid solution through the liquid miscibility gap, whereby the nanoparticles form a coating on liquid droplets of the minority phase that forms in a liquid matrix of the majority phase; and (d) cooling the resulting material to a temperature below the solidus temperature, whereby the solid immiscible alloy material forms.

2. The method of claim 1, wherein the step of cooling the liquid solution through the liquid miscibility gap is carried out at a cooling rate of no greater than about 500 K/s.

3. The method of claim 1, wherein the minority phase particles have an average diameter of no greater than about 20 μm and the average smallest diameter for the distribution of the thermally stable nanoparticles is no greater than about 250 nm.

4. The method of claim 3, wherein the nanoparticles account for about 0.1 to about 5 vol. % of the solid immiscible alloy.

5. The method of claim 1, wherein the first inorganic material is a metal, the second inorganic material is a metal or metalloid and the thermally stable material is a ceramic.

6. The method of claim 5, wherein the immiscible alloy is an aluminum-based alloy.

* * * * *